United States Patent
Röders

(10) Patent No.: US 12,042,970 B2
(45) Date of Patent: Jul. 23, 2024

(54) DEVICE AND METHOD FOR COOLING A CASTING MOLD

(71) Applicant: G.A. Röders Holding GmbH & Co. KG, Soltau (DE)

(72) Inventor: Andreas Röders, Soltau (DE)

(73) Assignee: G.A. Röders Holding Gmbh & Co. KG, Soltau (DE)

(*) Notice: Subject to any disclaimer, the term of this patent is extended or adjusted under 35 U.S.C. 154(b) by 1015 days.

(21) Appl. No.: 16/969,885

(22) PCT Filed: Feb. 12, 2019

(86) PCT No.: PCT/EP2019/053425
§ 371 (c)(1),
(2) Date: Aug. 13, 2020

(87) PCT Pub. No.: WO2019/158521
PCT Pub. Date: Aug. 22, 2019

(65) Prior Publication Data
US 2020/0406520 A1   Dec. 31, 2020

(30) Foreign Application Priority Data
Feb. 13, 2018   (EP) .................................... 18156455

(51) Int. Cl.
*B29C 39/38* (2006.01)
*B29C 45/73* (2006.01)

(52) U.S. Cl.
CPC .......... *B29C 45/7337* (2013.01); *B29C 39/38* (2013.01)

(58) Field of Classification Search
None
See application file for complete search history.

(56) References Cited

FOREIGN PATENT DOCUMENTS

| DE | 1758140 A1 | 5/1971 |
| DE | 3322312 A1 | 1/1985 |
| DE | 102008000452 A1 | 9/2009 |
| DE | 102008062433 B3 | 5/2010 |
| EP | 2796268 A1 | 10/2014 |
| JP | H09308954 A | 12/1997 |
| JP | 2000015421 A | 1/2000 |
| JP | 2014117713 A | 6/2014 |
| WO | 2005123357 A2 | 12/2005 |

OTHER PUBLICATIONS

Molkenthin DE3322312 Translation 1985 (Year: 1985).*
Anonymous "Evaporative Cooling of Injection Mold Inserts" 2002 (Year: 2002).*
Obermair EP2796268 Translation 2014 (Year: 2014).*
Theinel P et al: "Kuerzere Huehlzeiten", Plastverarbeiter, Huethig GmbH, Heidelberg, DE, vol. 56, No. 8, Aug. 1, 2005 (Aug. 1, 2005), pp. 78/79, XP001246842, ISSN: 0032-1338.
Anonymous, "Evaporative cooling of injection mold inserts", ip.com Journal, ip.com Inc., West Henrietta, NY, US, May 15, 2002 (May 15, 2002), ISSN: 1533-0001, XP013003082.
PCT International Search Report for PCT/EP2019/053425 dated Apr. 8, 2019; 3 pgs.
English Translation of PCT International Preliminary Report on Patentability for International application No. PCT/EP2019/053425 filed Feb. 12, 2019; Date of Completion: May 18, 2020, Date of Mailing Aug. 13, 2020; 7 pgs.

* cited by examiner

*Primary Examiner* — Jacob T Minskey
*Assistant Examiner* — Adrien J Bernard
(74) *Attorney, Agent, or Firm* — Alix, Yale & Ristas, LLP

(57) ABSTRACT

The invention relates to a device for cooling a casting mold (14), comprising an evaporation chamber (18) formed in the casting mold (14), a first pump (23) for supplying a liquid to the evaporation chamber (18), and a second pump (30, 31) for applying a pressure in the evaporation chamber (18), which differs from the atmospheric pressure. The invention also relates to a corresponding method. The invention allows the cooling of a casting mold to be controlled in a targeted manner. This can be helpful in particular in the injection molding of plastic parts.

18 Claims, 2 Drawing Sheets

DEVICE AND METHOD FOR COOLING A CASTING MOLD

BACKGROUND

The invention relates to a device for cooling a casting mold. The device comprises an evaporation chamber formed in the casting mold. A liquid is supplied to the evaporation chamber by means of a first pump.

In the production of castings, a casting material in a liquid state is supplied to a mold cavity of a casting mold. In the mold cavity, the casting material cools down and changes to a solid state. A casting that has a shape corresponding to the mold cavity is formed. The casting mold can be opened to remove the casting from the mold.

In order to be able to selectively influence the process of cooling, there is a known practice of forming an evaporation chamber in certain regions of the casting mold housing. A liquid, which is fed to the evaporation chamber at a high pressure, can expand in the evaporation chamber, as a result of which the liquid evaporates. The amount of heat required for evaporation is taken from the casting mold housing and, indirectly, from the casting material in the mold cavity, as a result of which it is possible to cool the casting material selectively in this section of the casting mold. This method for cooling a casting mold is also referred to as jet cooling.

If heat is removed from the casting mold by evaporating a liquid, this has the advantage that a defined temperature is established in the vicinity of the evaporation chamber owing to the constant evaporation temperature. When, for example, water evaporates at atmospheric pressure, the temperature is substantially constant at about 100° C.

EP 2 796 268 A1 presents a device for controlling the temperature of a tool mold, wherein a temperature-control fluid circuit is set up to cool the tool mold by means of vacuum evaporation cooling. German Laid-Open Application DE 1 758 140 A1 relates to a method and a device for controlling the temperature of molds, wherein a circulating liquid is partially evaporated by means of a controllable vacuum.

SUMMARY OF THE INVENTION

It is the underlying object of the invention to present a device and a method for cooling a casting mold, by means of which the cooling process can be selectively influenced. Proceeding from the cited prior art, the object is achieved by means of the features of the independent claims. Advantageous embodiments are specified in the dependent claims.

In the device according to the invention, a second pump is provided for applying a pressure in the evaporation chamber which differs from atmospheric pressure. By setting the pressure in the evaporation chamber, the temperature at which the liquid evaporates can be influenced. By increasing the pressure in the evaporation chamber, the evaporation temperature can be increased and, by reducing the pressure in the evaporation chamber, the evaporation temperature can be reduced. By means of a reduced evaporation temperature, the cooling process can be accelerated, and this can be used to reduce the cycle time during the production of castings. With an increased evaporation temperature, it is possible to slow down the cooling process, thereby making it possible to achieve a higher surface quality or an improved structure of the material in certain castings.

The invention has recognized that it is advantageous to put the liquid supplied to the evaporation chamber under pressure by means of the first pump. The cooling device according to the invention comprises an inlet line which extends to the evaporation chamber. In order to allow selective cooling, it is advantageous if the liquid does not evaporate in the inlet line but only when the liquid emerges from the inlet line into the evaporation chamber. This can be achieved by putting the liquid in the inlet line under an increased pressure. According to the invention, the pressure to which the liquid in the inlet line is subject is therefore higher than the pressure in the evaporation chamber.

A section of the inlet line which is adjacent to the evaporation chamber can have a diameter which is smaller than the diameter of the inlet line in a section further away from the evaporation chamber. That section of the inlet line which is adjacent to the evaporation chamber can form a local constriction in the inlet line and emerge in the evaporation chamber. During the operation of the device according to the invention, there may be a pressure difference across the local constriction. The pressure difference across the local constriction can account for at least 2%, preferably at least 5%, as a further preference at least 10%, of the total pressure difference that is present between the outlet of the first pump and the inlet of the second pump. The path along which the pressure difference is considered extends from the first pump, via the local constriction and the evaporation chamber, to the second pump. The pressure difference across the local constriction is preferably between 30% and 90% of the total pressure difference. It is thereby possible to ensure that the liquid in the inlet line up to the constriction retains a pressure high enough to ensure that it does not evaporate. In the section forming the local constriction and situated adjacent to the evaporation chamber, the inlet line can have a diameter of between 0.5 mm and 2 mm, preferably between 0.8 mm and 1.2 mm. This refers to an inlet line with a circular cross section. In the case of inlet lines with a different cross section, the cross-sectional area can be of a corresponding magnitude.

In order to prevent evaporation of the liquid in the inlet line even when the temperature in the inlet line is significantly above the evaporation temperature in the evaporation chamber, the liquid in the inlet line can be under an appropriately high pressure. For example, the pressure in the inlet line can be at least 5 bar, preferably at least 10 bar, as a further preference at least 20 bar, higher than the pressure in the evaporation chamber. The first pump of the device according to the invention can be a liquid pump which is suitable for delivering the liquid at such a pressure through the inlet line.

The device according to the invention can comprise an outlet line, through which the residues of the liquid can be discharged from the evaporation chamber in the evaporated or the liquid state. In order to avoid a sharp pressure rise in the evaporation chamber when the liquid evaporates, the outlet line can have a larger cross section than the inlet line.

The second pump, by means of which, according to the invention, the pressure in the evaporation chamber is set, can be connected to the outlet line. This means that the pressure built up by the second pump is transferred to the evaporation chamber via the outlet line or via a section of the outlet line.

The device according to the invention can be connected to a condenser, in which evaporated quantities of liquid from the evaporation chamber can be re-condensed. The condenser can comprise a heat exchanger, by means of which excess heat is dissipated. Water can be used as a cooling medium for the condenser, for example.

The condenser can comprise a tank, the lower region of which is filled with liquid. The first pump can be connected to the lower region of the tank. When the first pump is in operation, liquid is drawn in from the lower region of the tank and delivered to the evaporation chamber through the inlet line.

The second pump, by means of which the desired pressure is produced in the evaporation chamber, can be connected to the tank of the condenser above the liquid level. A vacuum or excess pressure produced by the second pump is transmitted to the evaporation chamber through the tank of the condenser and the outlet line. A pressure accumulator can be arranged between the second pump and the evaporation chamber, thus enabling the desired pressure to be maintained in the evaporation chamber even when the second pump is not in operation.

It is possible to connect to the outlet line a valve that establishes a connection between the outlet line and atmospheric pressure in the open state. When the valve is open, a pressure equalization takes place between the outlet line and the environment, resulting in atmospheric pressure in the outlet line. It may be expedient, between two cycles in which liquid is evaporated in the evaporation chamber for the purpose of cooling, to perform an equalization to atmospheric pressure in order to prevent evaporation of liquid quantities during those phases in which no cooling action is desired.

The valve can be arranged at a suitable point between the evaporation chamber and the second pump, e.g. on the outlet line, on the condenser or on the pressure accumulator.

The cooling device according to the invention can be equipped with a gas connection via which a gas, in particular air, can be let into the evaporation chamber in order to expel liquid residues from the evaporation chamber. The removal of liquid residues from the evaporation chamber can be performed in order to create for the next cooling process a defined initial situation, in which the evaporation chamber is filled exclusively with gas. The gas connection can be connected directly to the evaporation chamber or to a section of the inlet line, for example.

When the gas connection is open, the gas can enter the evaporation chamber owing to the effect of a pressure difference. If there is a vacuum in the evaporation chamber, the pressure difference relative to atmospheric pressure may be sufficient to drive the gas. It is also possible for the gas to be introduced into the gas connection at an excess pressure relative to atmospheric pressure. The liquid supply through the inlet line is preferably interrupted while gas is entering the evaporation chamber.

In one embodiment, the second pump is a vacuum pump which is designed to apply a pressure lower than atmospheric pressure in the evaporation chamber. The absolute pressure in the evaporation chamber when the second pump is in operation can be between 50 mbar and 800 mbar, preferably between 100 mbar and 500 mbar, for example. If the pressure in the evaporation chamber is reduced to 200 mbar, for example, the water evaporates at just 70° C. The use of a vacuum pump is expedient if the cooling process is to be accelerated by the invention.

The use of a vacuum pump as a second pump is furthermore expedient if the casting process takes place at mold temperatures below 100° C. By evaporating water at atmospheric pressure, it is then not possible to achieve a cooling effect. Mold temperatures below 100° C. are used, for example, when injection molding certain plastics, for instance polyoxymethylene (POM), polyamide (PA) or polybutylene terephthalate (PBT).

In another embodiment, the second pump is an excess pressure pump, which is designed to apply a pressure higher than atmospheric pressure in the evaporation chamber. The absolute pressure in the evaporation chamber when the second pump is in operation can be between 5 bar and 15 bar, for example. The use of an excess pressure pump as a second pump maybe expedient if the cooling process is to be slowed down by the invention.

If working at mold temperatures significantly above 100° C., the casting mold is cooled very intensively in local areas when water is evaporated at atmospheric pressure in the evaporation chamber. Such intensive local cooling can have unwanted effects on the structure of the material in the casting mold or can lead to a reduced surface quality. If the absolute pressure in the evaporation chamber is increased to a value of, for example, 10 bar, the water evaporates only at a temperature of about 200° C. In this way, the material in the casting mold can be subjected to less abrupt cooling. A slower cooling process may be desired when injection molding certain plastics, for example. Examples of such plastics are polyacrylic acid (PAA), polyphthalim ides (PPA) or polyphenylene sulfide (PPS).

The cooling device according to the invention can be configured in such a way that it comprises a vacuum pump and an excess pressure pump. A changeover valve can be provided for switching between the vacuum pump and the excess pressure pump, thus making it possible to switch between the vacuum pump and the excess pressure pump, depending on the desired cooling temperature in the evaporation chamber.

The casting mold of the device according to the invention can comprise a plurality of evaporation chambers. Liquid for evaporation can be supplied synchronously or independently to the evaporation chambers.

The first pump and the second pump of the device according to the invention may be designed as separate structural units. It is also possible for the first pump and the second pump to be functional elements within a single pump unit.

The invention furthermore relates to a plastics injection molding machine in which an injection mold is cooled by means of such a device.

The invention furthermore relates to a method for cooling a casting mold in which a liquid is supplied to an evaporation chamber formed in the casting mold in order to evaporate the liquid in the evaporation chamber. In the method, a pressure which differs from atmospheric pressure is applied in the evaporation chamber. In this case, the liquid in the inlet line is put under an increased pressure, with the result that the liquid does not evaporate in the inlet line. The invention furthermore relates to a method for producing a plastics injection molding in which an injection mold is cooled by this method.

The method can be refined by further features, which are described in conjunction with the device according to the invention. The device can be refined by further features, which are described in conjunction with the method according to the invention.

BRIEF DESCRIPTION OF THE DRAWINGS

The invention is described by way of example below by means of advantageous embodiments with reference to the attached drawings. In the drawings.

DETAILED DESCRIPTION

Figure 1:
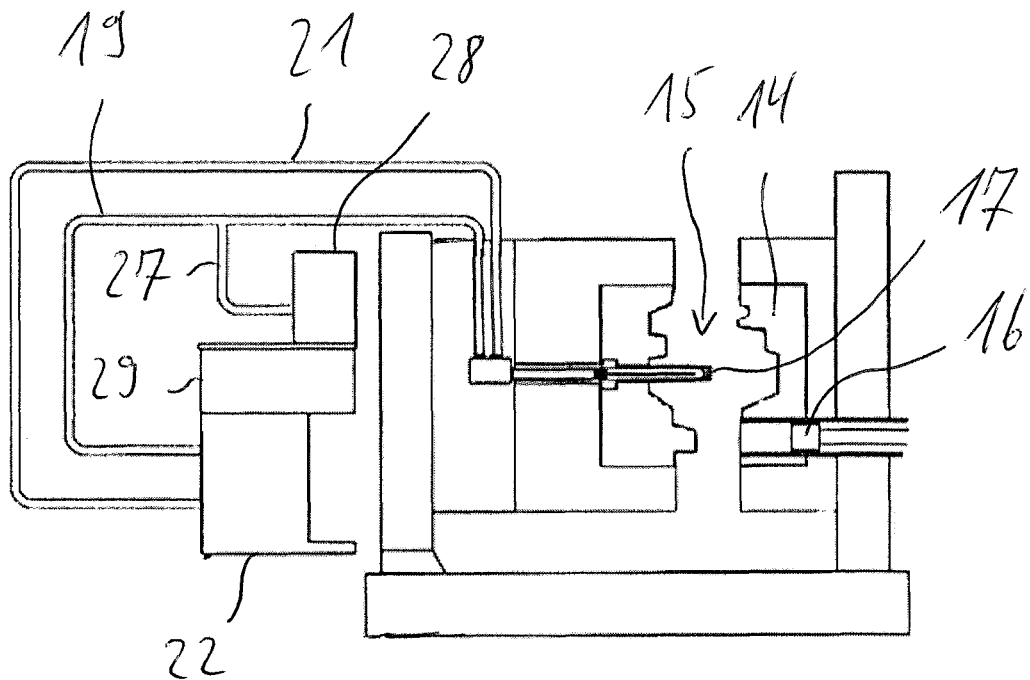
FIG. 1: shows a schematic illustration of a plastics injection molding machine according to the invention.

A plastics injection molding machine shown in FIG. 1 comprises an injection mold 14, in which a mold cavity 15 is formed. The injection mold 14 is shown in the open state, in which two halves of the injection mold 14 are spaced apart. In the open state, an injection molding can be removed from the mold cavity 15 of the injection mold 14.

For the next injection molding process, the injection mold 14 is brought into a closed state, in which the two halves of the injection mold 14 end in leaktight contact with one another. By means of a forward movement of a reciprocating screw 16, a plastics material in a liquid state is introduced into the mold cavity 15. There is a pause until the plastics material has hardened by cooling down. The injection mold 14 is opened and the finished injection molding is removed.

The injection mold 14 comprises a mold core 17 which projects into the mold cavity 15 and which defines a cylindrical depression in the injection molding. For a good structure and surface quality of the injection molding in the region of the cylindrical depression, the cooling process should be selectively controlled in this region.

Figure 2:
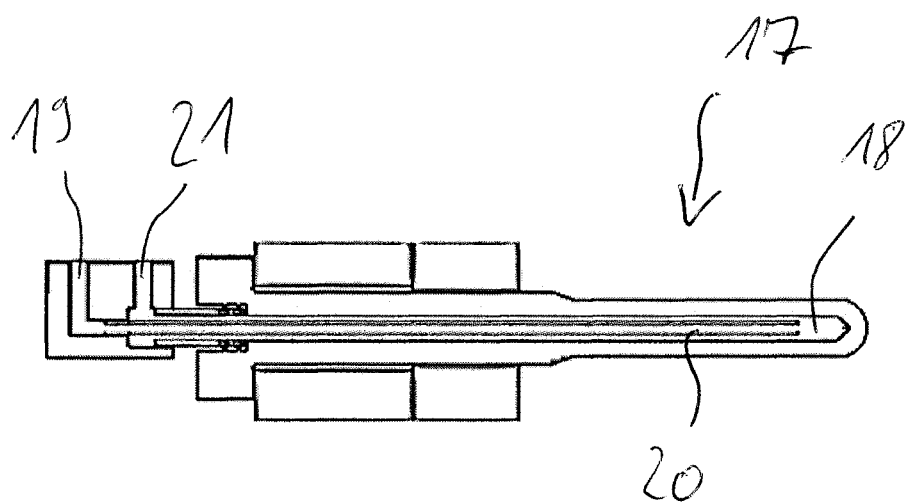
FIG. 2: shows a detail from FIG. 1 in an enlarged illustration.

For this purpose, as illustrated in the enlarged illustration in FIG. 2, the mold core 17 comprises an evaporation chamber 18, in which a liquid is evaporated during the cooling process. A temperature corresponding to the evaporation temperature of the liquid is established in the evaporation chamber 18, with the result that the cooling of the plastics material in the mold cavity 15 takes place under defined conditions.

According to the enlarged illustration in FIG. 2, an inlet line 19 extending as a channel as far as the evaporation chamber 18 is formed in the mold core 17. Arranged in a forward section of the inlet line 19 is a capillary tube 20, which has a diameter of about 1 mm.

A liquid, e.g. water, is introduced at high pressure into the evaporation chamber 18 through the inlet line 19 and the capillary tube 20. The pressure in the inlet line 19 can be 15 bar, for example. The pressure in the inlet line 19 can drop across the capillary tube 20 between the transition from the inlet line 19 to the capillary tube 20 and the outlet of the capillary tube 20 in the evaporation chamber 18. The temperature of the mold core 17 is higher than the evaporation temperature of the water, and therefore the water in the evaporation chamber 18 evaporates.

According to FIG. 1, the inlet line 19 is connected to a cooling device 22. According to the schematic illustration in FIG. 3, the cooling device 22 comprises a first pump 23, which is designed to pump the water at high pressure through the inlet line 19 to the evaporation chamber 18. The steam and liquid residues are discharged from the evaporation chamber 18 and fed back to the cooling device 22 through an outlet line 21.

A condenser 24, in which the steam is re-condensed, is formed in the cooling device 22. The heat of condensation is dissipated from the condenser 24 by means of a heat exchanger 25, which is connected to a cold water circuit 26. The water collects in a lower section of the condenser 24 and can be drawn in again by the pump 23.

A compressor 28 is furthermore connected to the inlet line 19 via a compressed air line 27. After the conclusion of a cooling process and when the injection mold 14 is open, a compressed air pulse is passed through the inlet line 19 in order to displace the steam and liquid residues completely from the evaporation chamber 18, ensuring defined starting conditions for the next cooling process.

If atmospheric pressure is present in the operation chamber 18, the water evaporates at 100° C. In the illustrative embodiment under consideration, work is carried out at a mold temperature of 90° C., and therefore no cooling effect can be achieved by evaporation at 100° C.

The cooling device 22 of the injection molding machine according to the invention therefore comprises a pressure module 29, which is designed to selectively apply a certain pressure in the evaporation chamber 18 in order to influence the evaporation temperature. This can take place in two directions. The evaporation temperature can be reduced by reducing the pressure in the evaporation chamber 18. By means of a reduced evaporation temperature, the cooling process can be accelerated, and this can be used to reduce the cycle time during the production of injection moldings. By increasing the pressure in the evaporation chamber 18, the evaporation temperature is increased, thereby enabling the cooling process of the plastics material to be slowed down. With certain plastics materials, it is thereby possible to improve the surface quality.

Figure 3:
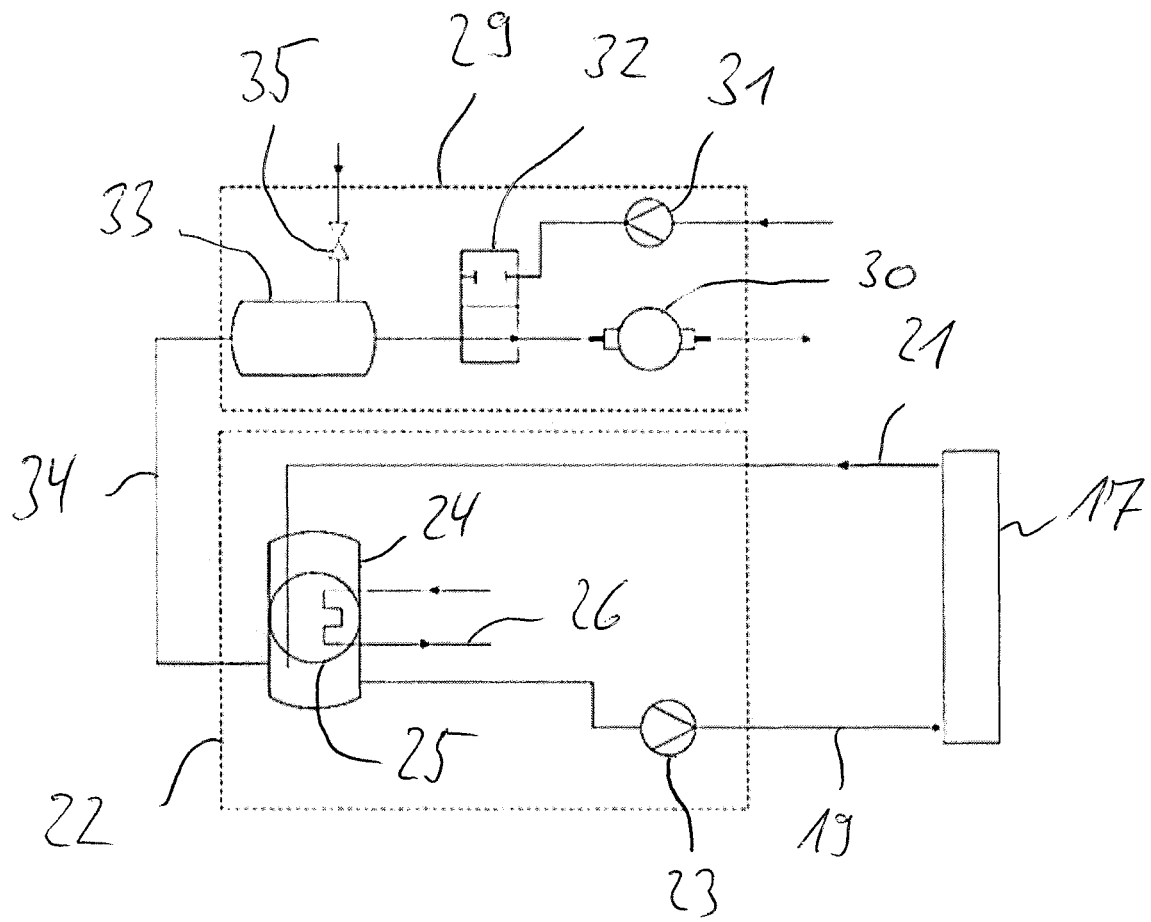
FIG. 3: shows a schematic illustration of a device according to the invention for cooling the casting mold.

According to FIG. 3, the pressure module 29 comprises a vacuum pump 30 and an excess pressure pump 31, between which it is possible to switch by means of a changeover valve 32. The vacuum pump 30 and the excess pressure pump 31 are second pumps in the sense according to the invention. By means of the pumps 30, 31, it is possible to apply a pressure that differs from atmospheric pressure in a pressure vessel 33. In order to allow a pressure equalization with atmospheric pressure, the pressure vessel 33 is connected to the environment via a valve 35.

The pressure from the pressure vessel 33 is transmitted via an inter-mediate line 34, the interior of the condenser 24 and the outlet line 21 to the evaporation chamber 18. If the pressure vessel 33 is evacuated to an absolute pressure of 200 mbar, for example, by means of the vacuum pump 33, the pressure in the evaporation chamber 18 is also 200 mbar. The water then evaporates at a temperature of just 70° C., thus accelerating the cooling process. With a shorter cooling process, it is possible to contribute to a shortening of the cycle time during the production of injection moldings.

If an excess pressure is applied in the pressure vessel 33 by means of the excess pressure pump 31, this pressure is also transmitted to the evaporation chamber 18. An increased pressure in the evaporation chamber 18 leads to an increased evaporation temperature and thus to slowing down of the cooling process. With certain plastics materials, an improved surface quality of the injection molding can be achieved by a slower cooling process.

The invention claimed is:

1. A device for cooling a casting mold (14), having an evaporation chamber (18) formed in the casting mold (14), a first pump (23) for supplying a liquid to the evaporation chamber (18), and a second pump (30, 31) for applying a pressure in the evaporation chamber (18) which differs from atmospheric pressure, an inlet line (19) which extends to the evaporation chamber (18), wherein the liquid in the inlet line (19) is put under an increased pressure, with the result that the liquid does not evaporate in the inlet line (19), wherein the first pump (23) is designed to deliver the liquid at said increased pressure through the inlet line (19), and wherein a section of the inlet line (19) which is adjacent to the evaporation chamber (18) forms a local constriction in the inlet line (19).

2. The device as of claim 1, wherein the inlet line (19) has a diameter of between 0.5 mm and 2 mm in the section (20) which forms the local constriction and is adjacent to the evaporation chamber.

3. The device of claim 1, wherein the first pump delivers the liquid to the local constriction in the inlet line (19) at a pressure which is higher than the pressure in the evaporation chamber (18) by at least 5 bar.

4. The device of claim 1, comprising an outlet line (21) which extends from the evaporation chamber (18).

5. The device of claim 4, wherein the outlet line (21) has a larger cross section than the inlet line (19).

6. The device of claim 4, wherein the second pump (30, 31) is connected to the outlet line.

7. The device of claim 1, comprising a condenser (24) for condensing evaporated liquid quantities from the evaporation chamber (18).

8. The device of claim 1, comprising a gas connection (27) for supplying a gas to the evaporation chamber (18).

9. The device of claim 1, wherein the second pump is a vacuum pump (30).

10. The device of claim 1, wherein the second pump is an excess pressure pump (31).

11. A plastics injection molding machine having an injection mold (14) and having a device for cooling the injection mold (14), wherein the device for cooling is designed in accordance with claim 1.

12. A method for cooling a casting mold (14), in which a liquid is supplied through an inlet line (19) to an evaporation chamber (18) formed in the casting mold (14) in order to evaporate the liquid in the evaporation chamber (18), and in which a pressure which differs from atmospheric pressure is applied in the evaporation chamber (18), wherein the liquid in an inlet line (19) leading to the evaporation chamber (18) is put under an in-creased pressure, with the result that the liquid does not evaporate in the inlet line (19), and a section of the inlet line (19) which is adjacent to the evaporation chamber (18) forms a local constriction in the inlet line (19).

13. A method for producing a plastics injection mold component in which an injection mold (14) is cooled by the method of claim 12.

14. The device of claim 1, wherein the inlet line (19) has a diameter of between 0.8 mm and 1.2 mm in the section (20) which forms the local constriction and is adjacent to the evaporation chamber.

15. The device of claim 1, wherein the first pump delivers the liquid to the local constriction in the inlet line (19) at a pressure which is higher than the pressure in the evaporation chamber (18) by at least 10 bar.

16. The device of claim 1, wherein the first pump delivers the liquid to the local constriction in the inlet line (19) at a pressure which is higher than the pressure in the evaporation chamber (18) by at least 20 bar.

17. The device of claim 1, wherein the second pump (30, 31) comprises a vacuum pump (30) and an excess pressure pump (31) and the device comprises a changeover valve (32) for switching between the vacuum pump (30) and the excess pressure pump (31), making it possible to switch between the vacuum pump (30) and the excess pressure pump (31) depending on the desired cooling temperature in the evaporation chamber (18).

18. The method of claim 12, wherein the pressure which differs from atmospheric pressure applied to the evaporation chamber (18) is selected from a range of pressures from a negative pressure less than atmospheric pressure to a positive pressure higher than atmospheric pressure, depending on the desired cooling temperature in the evaporation chamber (18).

* * * * *